Dec. 2, 1924.
E. J. FRASER
1,517,419
PISTON RING CONTRACTOR
Filed Dec. 11, 1922
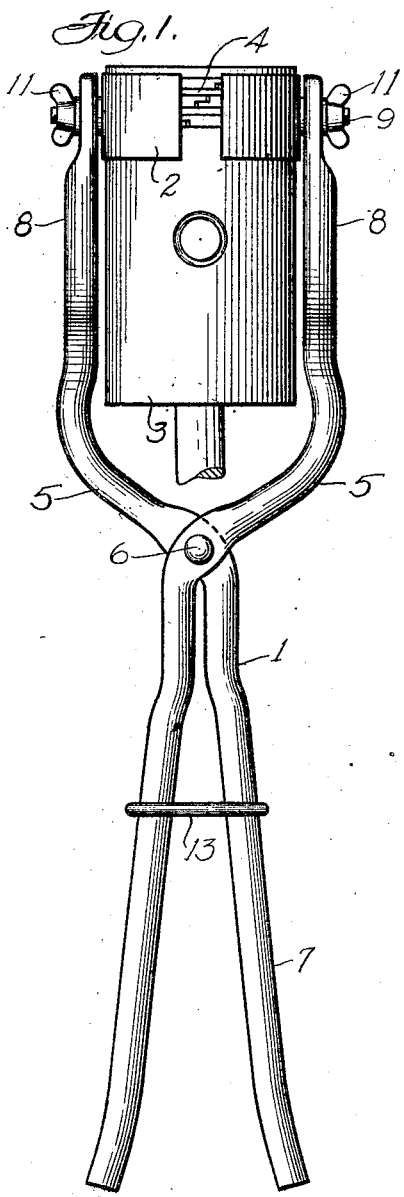
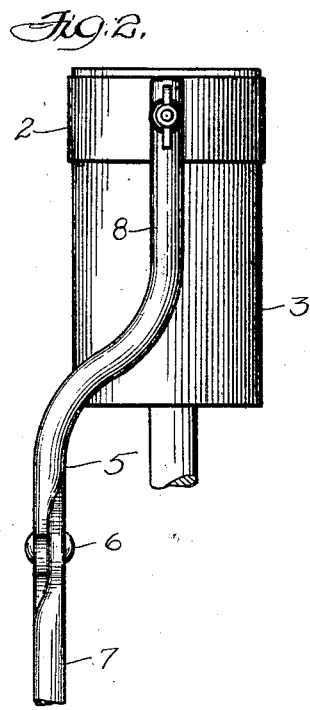
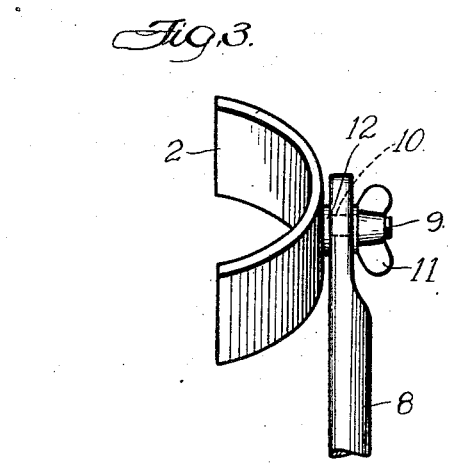
Inventor:
Edwin J. Fraser Patented Dec. 2, 1924.

1,517,419

UNITED STATES PATENT OFFICE.

EDWIN J. FRASER, OF BERWYN, ILLINOIS, ASSIGNOR OF ONE-HALF TO SAMUEL H. BINGHAM, OF CHICAGO, ILLINOIS.

PISTON-RING CONTRACTOR.

Application filed December 11, 1922. Serial No. 606,167.

*To all whom it may concern:*

Be it known that I, EDWIN J. FRASER, a citizen of the United States of America, and a resident of Berwyn, county of Cook, and State of Illinois, have invented a new and useful Improvement in Piston-Ring Contractors, of which the following is a specification.

This invention relates to clamps for use in holding piston rings in a contracted position while the piston is being inserted into a cylinder block. Tools of the aforesaid type generally include a handle in the form of a pair of tongs connected to the ends of a flexible band which is adapted to be placed around the piston and rings and to be drawn together for compressing the rings when the tongs are gripped in one hand.

This common form of clamp is objectionable mainly for the reason that a piston supported therein is not properly balanced, due to the fact that the connections between the tongs and the ends of the flexible band are located at one side of the piston. The flexible band is also objectionable for the reason that when the piston rings are dry, the friction between the rings and the band causes the latter to bind at points adjacent its connection to the tongs with the result that uniform pressure is not exerted on all parts of the rings.

The main objects of this invention are to provide a piston ring contractor having an improved construction and arrangement of jaws for compressing the piston rings; to provide improved means for adjustably mounting the jaws on the handle so as to permit the handle to be used with sets of jaws of various sizes to accommodate pistons of different diameters; and to provide an improved relative arrangement of the jaws and handle whereby the handle may be held in various angular positions with respect to the cylinder bore so as to avoid obstruction by the crank shaft, connecting rod, or other operating parts of the engine, when the tool is in use.

An illustrative embodiment of this invention is shown in the accompanying drawings, wherein:

Figure 1 is an elevation of a piston ring clamp embodying this invention, showing a piston supported therein.

Figure 2 is an elevation taken from the right of Figure 1, part of the handle being broken away.

Figure 3 is an enlarged detail, in perspective, showing one of the jaws adjusted to an inclined position with respect to the handle.

Referring to the drawings, the tool comprises tongs 1, having a pair of detachable arcuate jaws 2, adapted to embrace the piston 3 and rings 4, for compressing the piston rings to permit the insertion of the piston into the cylinder block while the tongs are gripped in one hand.

In the form shown, the tongs comprise the usual levers 5 pivoted together at 6. One end of the tongs 1 forms a handle part 7, and the other end forms a pair of spaced arms 8 for supporting the jaws 2. The arms 8 are bent axially of the pivot 6, so as to offset the handle 7 to one side of the normal axis of the jaws 2, as shown in Figure 2.

The jaws 2 are in the form of arcuate bands pivotally connected to the tongs 1 by studs 9, which are rigidly mounted on the jaws in diametrically opposed relation to each other. The studs 9 are located at substantially the center of the jaws 2, and project outwardly through apertures 10 formed in the supporting arms 8. The central location of the studs 9 with respect to the jaws 2, insures a proper balancing of the piston while it is supported in the tongs. Wing nuts 11, threaded to the end of the studs 9, permit the jaws 2 to be clamped to the arms 8 in various angular positions relative to the tongs. Suitable washers 12 are preferably inserted between the jaws 2 and the arms 8. The detachable mounting of the jaws 2, permits their replacement by other sets of jaws of different sizes to accommodate pistons of various diameters, so that the same tongs may be used with several sets of jaws. Embracing the handle part 7, is a locking ring 13, which may be slipped outwardly along the handle for holding the jaws 2 in clamping position.

In operation, if it is desired to insert the piston into the cylinder from below the cylinder block, the piston and rings are gripped in the tool in the manner shown in Figures 1 and 2, so as to compress the rings to the diameter of the piston. The tool is gripped in one hand with its upper end abutting against the lower face of the cylinder block, while with the other hand, the piston is pushed upwardly through the jaws 2 and into the cylinder. The offset arrangement of the handle 7 permits the tool to be used in a vertical position below the cylinder block without obstruction by the crank shaft and connecting rods of the engine. If the piston is to be inserted from above the cylinder block, the handle 7 is preferably swung to the plane of the jaws 2, so as to be disposed at substantially right angles to the axis of the piston.

Although but certain specific embodiments of this invention have been herein shown and described, it will be understood that some of the details of the construction shown may be altered or omitted without departing from the spirit of this invention as defined by the following claims.

I claim:

1. A piston ring contractor comprising tongs having a pair of arcuate jaws at one end thereof arranged in opposed relation to each other so as to be adapted to embrace a piston ring, said tongs including a handle part offset from the normal axis of said jaws.

2. A piston ring contractor comprising tongs having a pair of arcuate jaws connected at their medial parts to one end of said tongs and arranged in opposed relation to each other so as to be adapted to embrace a piston ring, said tongs including a handle offset from the plane of the connections between said tongs and jaws.

3. A piston ring contractor comprising tongs having a pair of arcuate jaws at one end thereof arranged in opposed relation to each other so as to be adapted to embrace a piston ring, a pair of studs extending outwardly from the medial parts of said jaws and projecting through apertures formed in said tongs, and means on said studs for adjustably clamping said jaws to said tongs, said tongs including a handle part offset from the plane of said studs.

Signed at Chicago this 8th day of Dec. 1922.

EDWIN J. FRASER.